T. J. SLOAN.
MACHINE FOR COUNTING SCREWS, PINS, &c.
No. 8,615. Patented Dec. 23, 1851.
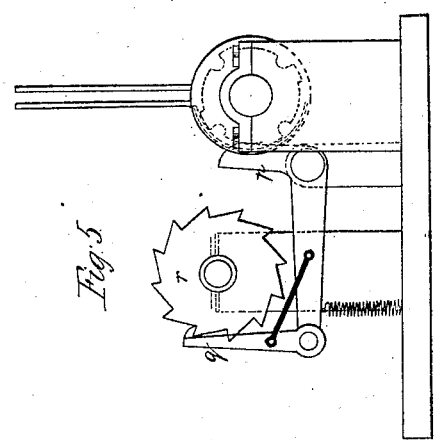
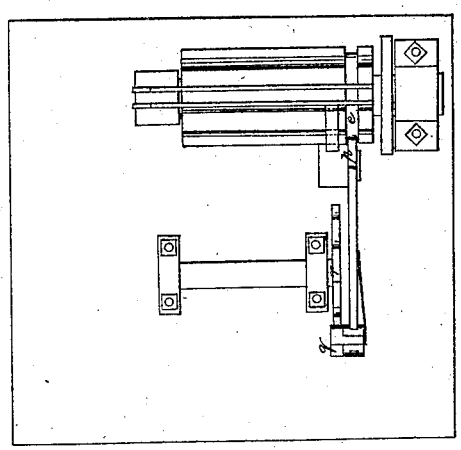
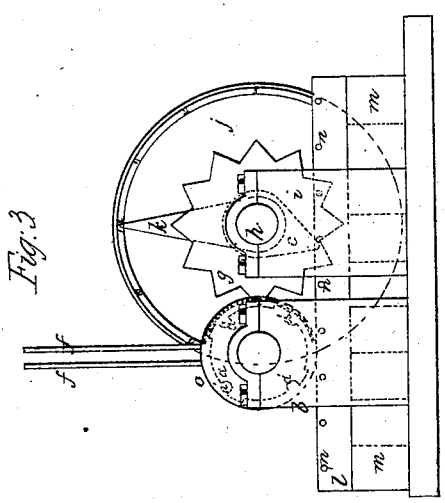
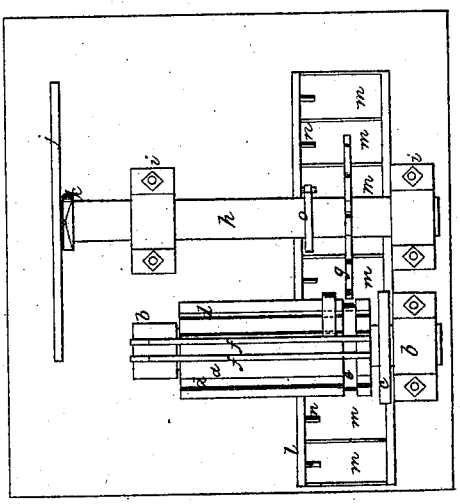
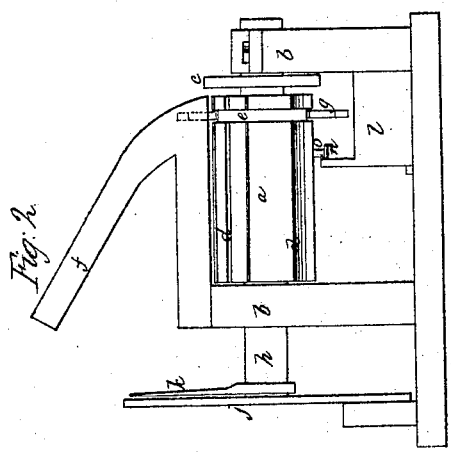

UNITED STATES PATENT OFFICE.

THOS. J. SLOAN, OF NEW YORK, N. Y.

MACHINE FOR COUNTING SCREWS AND PINS.

Specification of Letters Patent No. 8,615, dated December 23, 1851.

*To all whom it may concern:*

Be it known that I, THOMAS J. SLOAN, of the city, county, and State of New York, have invented a new and useful Machine for Counting Screws, Pins, and other Such Like Articles, and that the following is a full, clear, and exact description thereof, reference being had to the accompanying drawings, making part of this specification, in which—

Figure 1, is a plan; Fig. 2, an end elevation; Fig. 3, a side elevation, and Figs. 4 and 5, plan and side elevation of a modification of my said machine.

The same letters indicate like parts in all the figures.

The screws or other articles to be counted are delivered in a horizontal position one by one from inclined ways curved at their lower ends or from any other feeder into recesses made in the periphery of a wheel or cylinder formed with a groove in the direction of its circumference, the bottom of which groove must be within a circle, generated in the rotation of the wheel or cylinder—by the outer part of the screws or other articles to be counted lying in the longitudinal recesses of the said wheel or cylinder—and with this is combined a detector which may be a lever or toothed wheel or other analogous device, working in the said groove, so that as the wheel or cylinder is rotated, the detector lever or tooth wheel shall be operated by the passage of each screw or other article to be counted, but if they fail to enter any one of the recesses then the detector will not be operated.

By connecting an index or other counter with the detector, the number of articles delivered from the recesses of wheel or cylinder will be counted and registered.

In the accompanying drawings $a$. represents a cylinder mounted on a shaft turning in appropriate boxes in the standards $b$. $b$. of a suitable frame. This shaft is provided with a pulley $c$. so that the cylinder can be rotated at the required velocity by a band from any prime mover. This cylinder is formed with a series of recesses $d$. cut into its periphery at equal distances apart—parallel with one another and with the axis, and of such size as to receive freely the shanks of screws, pins or other articles to be counted, the heads projecting beyond the end. And it is also formed with a groove $e$. in the direction of its periphery and made of the same or nearly the same depth as the recesses $d$. Above the cylinder there are two inclined ways $f$. $f$. placed at such distance apart as to receive the shanks of the screws and permit them to hang by their heads and run down freely between them. The lower ends of these ways are curved so that the screws will be gradually brought to a horizontal position where they are delivered into the recesses $d$. of the cylinder. The screws are delivered on to the ways in any desired manner and when they reach the lower end, they will rest on the periphery of the cylinder, and as this rotates, one by one they will enter the recesses or grooves $d$.

By the side of the cylinder there is a wheel $g$. with teeth on its periphery which enter the groove $e$. of the cylinder. The shaft $h$. of this wheel, turns freely in boxes mounted in standards $i$. $i$. of the frame and as the cylinder rotates each screw strikes one cog of the said wheel and turns it a given distance but if there be no screws in the grooves then the wheel $g$. will not be turned. At the end of the shaft of the wheel $g$. there is a dial $j$. concentric therewith and having divisions corresponding with the number of cogs. And the shaft carries a pointer $k$. which indicates the number on the dial. As each screw can only pass by turning the wheel $g$. the distance of one tooth, the number of screws that have passed will be indicated by the position of the pointer on the dial. This dial and pointer may be multiplied at pleasure so that the second dial will register the number of turns the first pointer has made and so with a third and so on to any extent desired. But as this is a well known way of registering, it is deemed unnecessary to give a description and representation of more than one.

Below the cylinder there is a carriage $l$, sliding on appropriate ways, not necessary to describe—which carriage is provided with a series of boxes or bins $m$. In the side of the carriage there are cogs or pins $n$, one for each box or bin—and on the shaft of the wheel $g$, there is a cog or spur $o$, which at the end of each complete revolution of the wheel $g$, strikes one of the cogs $n$, and moves the carriage the distance of one box.

In this way it will be seen that after one box has received the required number of screws another empty box is brought under the cylinder to receive its proportion and so on until all the boxes are filled and then the carriage is run back.

Instead of the toothed wheel $g$, a lever $p$, may be employed, as represented by Figs 4 and 5. One arm of the said lever lies in the groove $e$, of the cylinder and the other arm carries a spring jointed catch or pawl $q$, which, every time it is vibrated by the passage of a screw will turn a ratchet wheel $r$, the distance of one tooth. The wheel $r$, can be connected in any desired manner with an index to register the number of screws delivered. And it may also be connected with the carriage above described. Or it may—as also the wheel $g$—be connected with any known stop motion for the purpose of stopping the mechanism for a given length of time, whenever a determined number of screws have been delivered.

What I claim as my invention and desire to secure by Letters Patent is—

The cylinder or wheel formed with recesses in its periphery for the reception of the screws or other articles to be counted, and provided with a groove for the reception of, and in combination with the detector to indicate, mark and register the number of screws or other articles that are delivered, the whole being constructed and made to operate substantially in the manner specified.

THOS. J. SLOAN.

Witnesses:
 CANSTAN BROWNE,
 W. H. BISHOP.